UNITED STATES PATENT OFFICE.

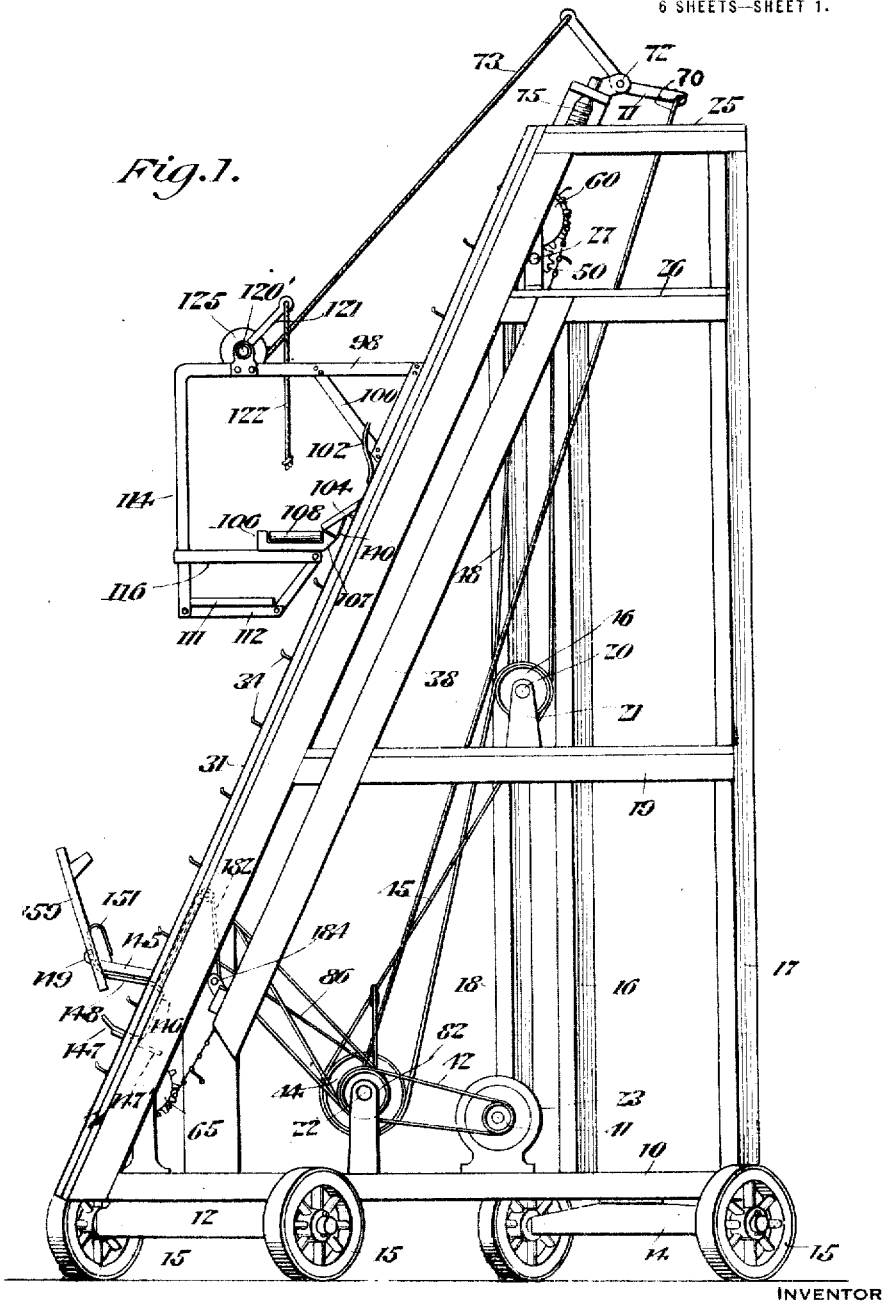

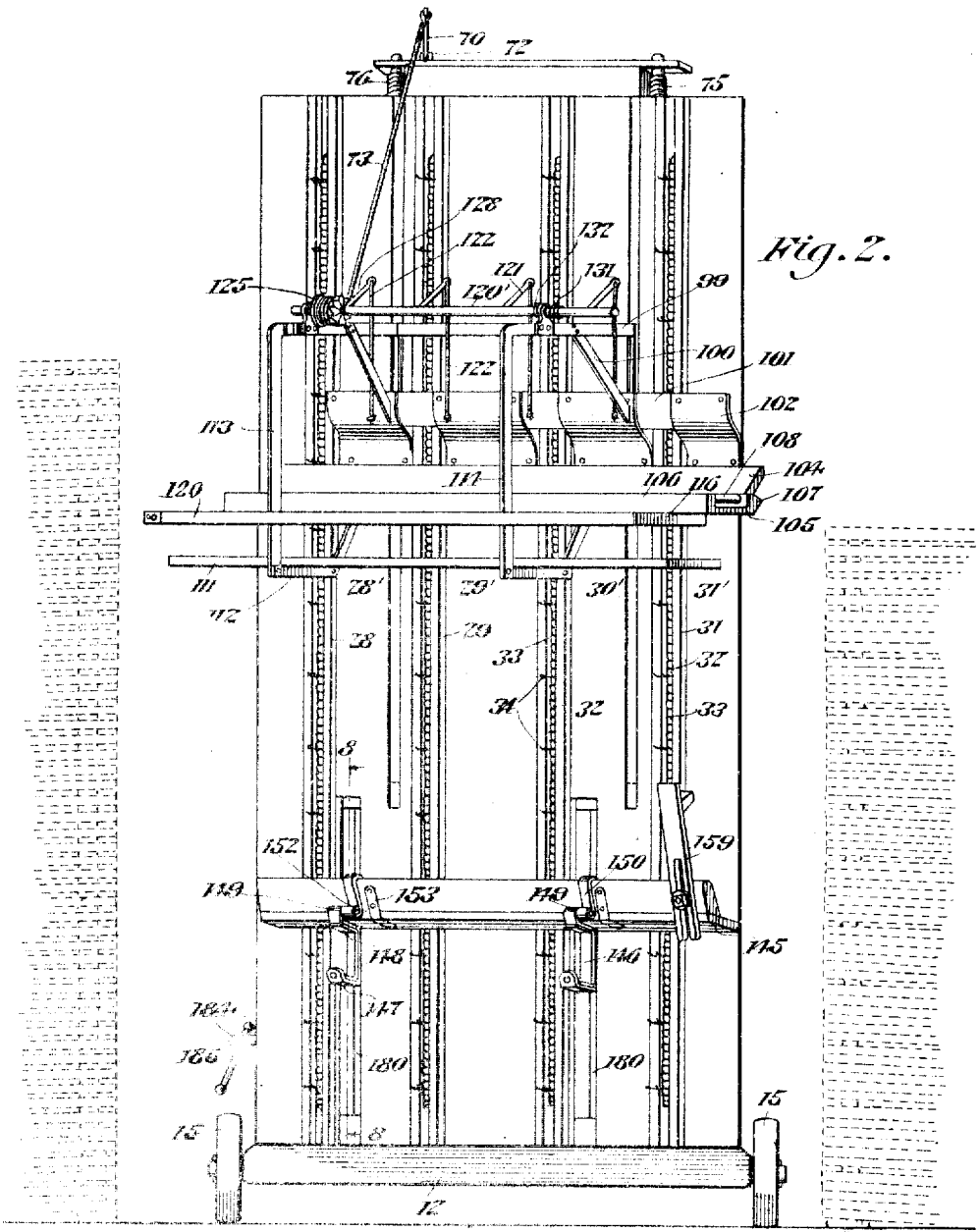

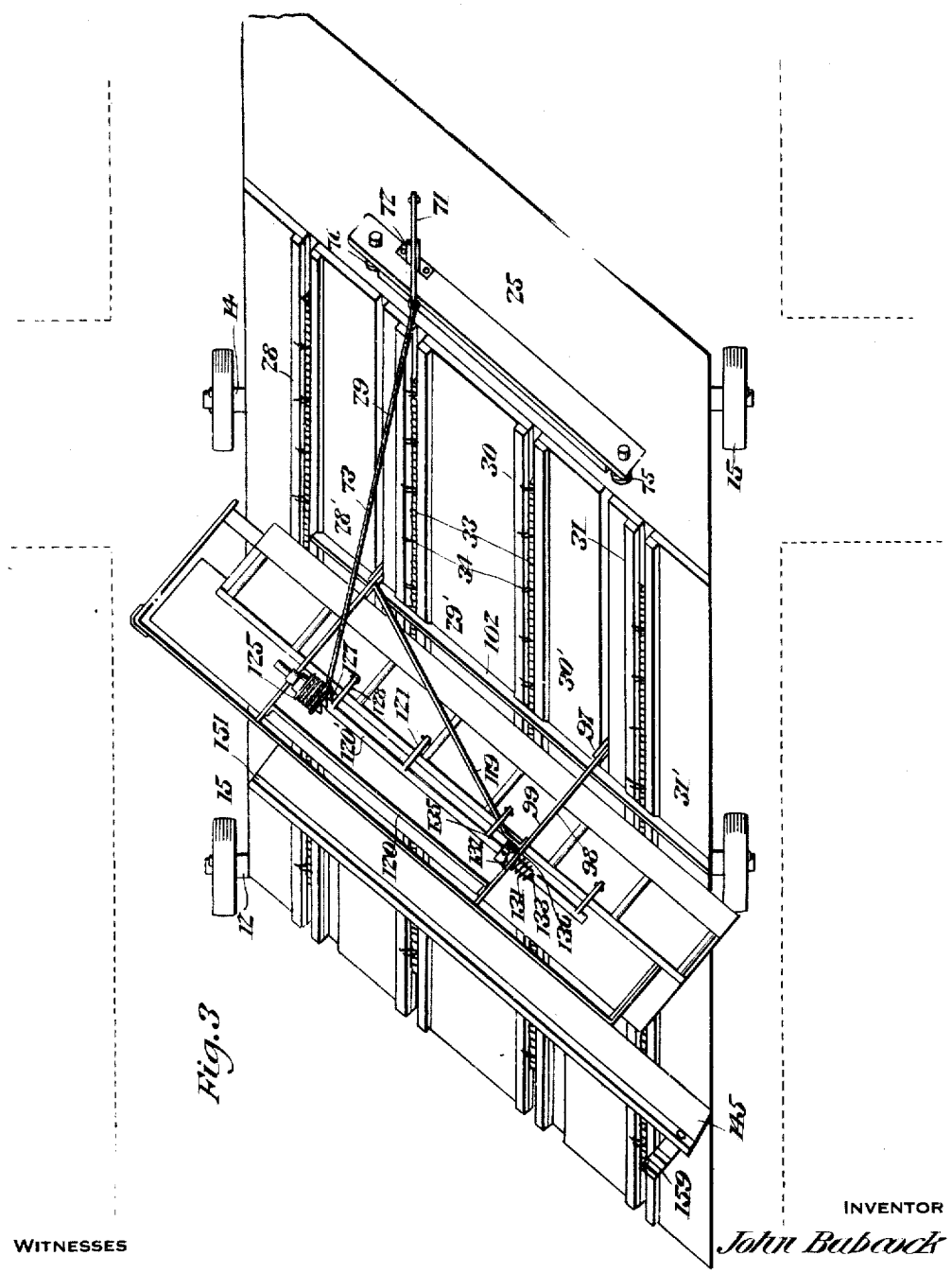

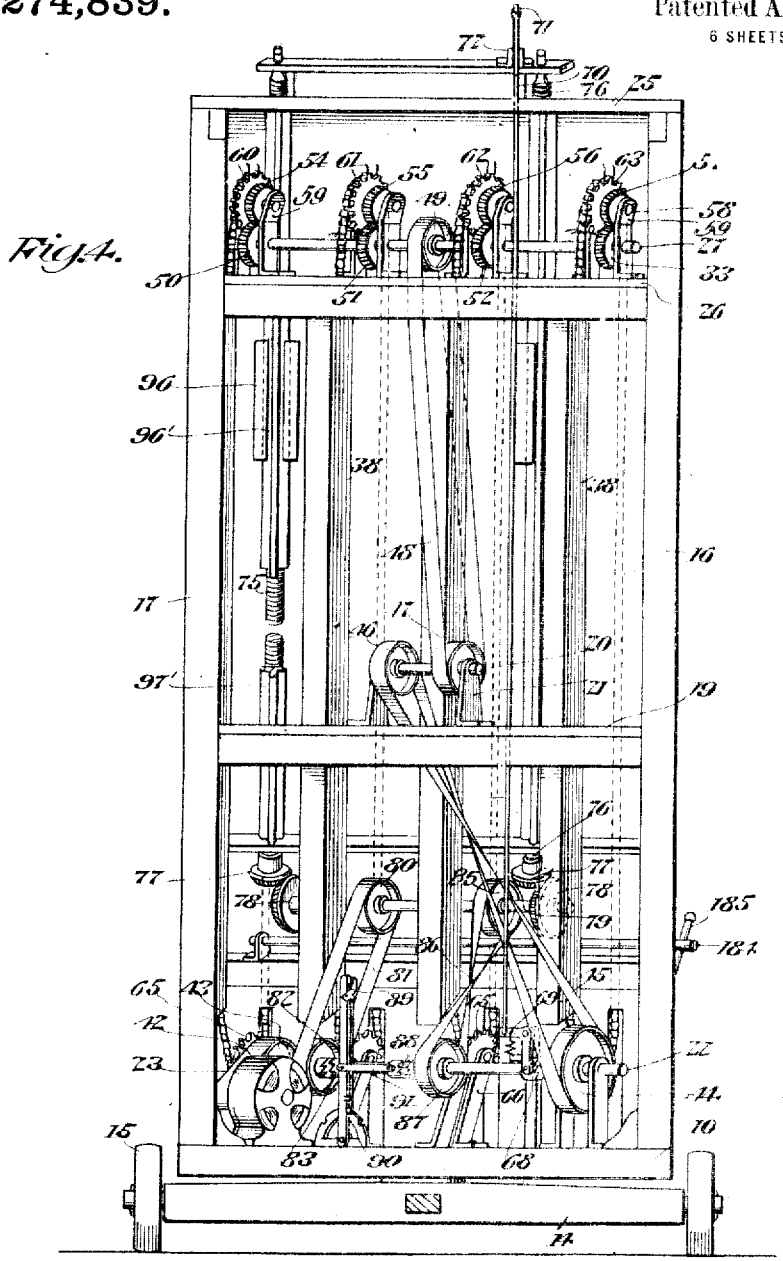

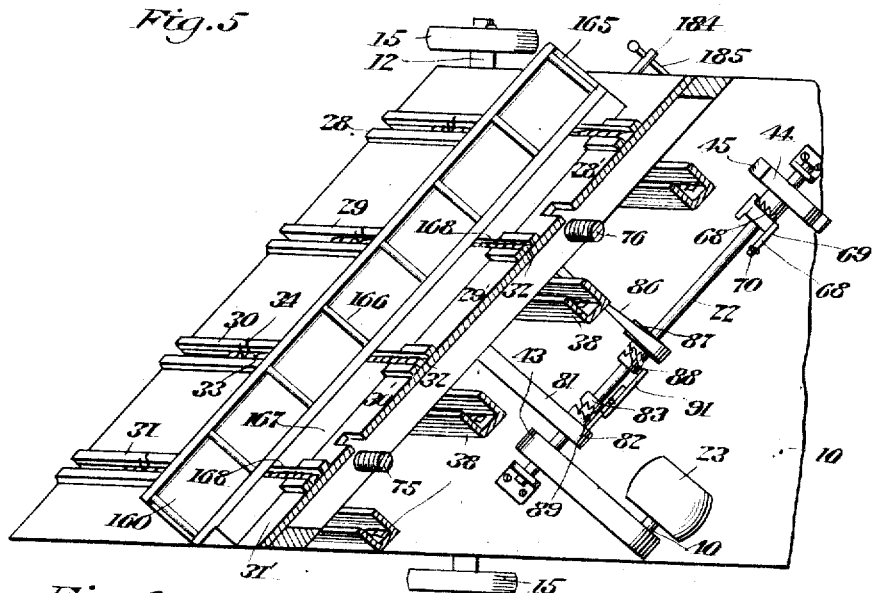
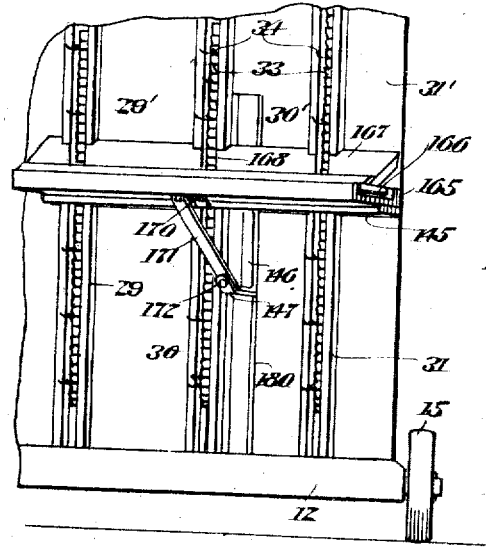
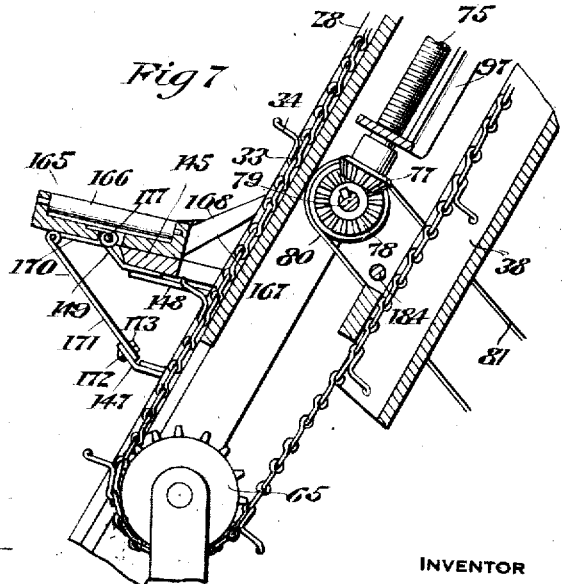

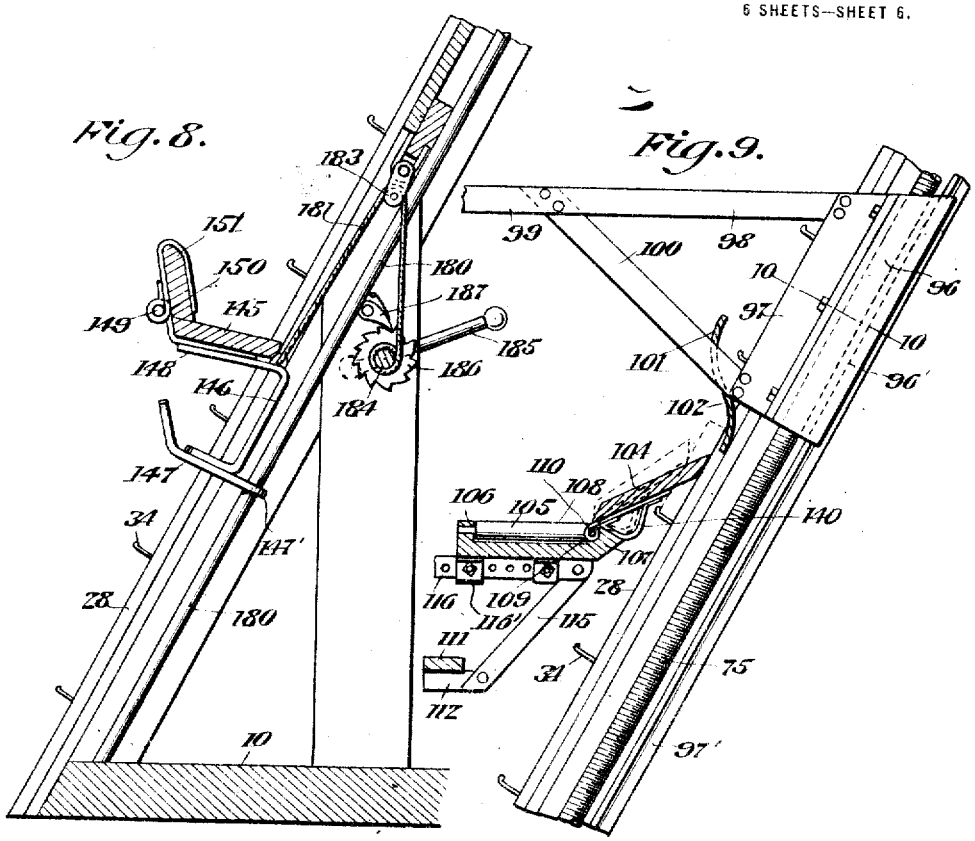

JOHN BABCOCK, OF LONG ISLAND CITY, NEW YORK.

LUMBER-STACKING MACHINE.

1,274,839.　　　Specification of Letters Patent.　　Patented Aug. 6, 1918.

Application filed April 18, 1917. Serial No. 162,913.

*To all whom it may concern:*

Be it known that I, JOHN BABCOCK, a citizen of the United States, residing at Long Island City, in the county of Queens and State of New York, have invented new and useful Improvements in Lumber-Stacking Machines, of which the following is a specification.

This invention relates to a lumber stacking machine and one object is to provide a device including a conveyer or a plurality of conveyers for receiving lumber from a wagon to be unloaded, said conveyer or conveyers elevating the boards to the required height permitting them to be placed on the top of a pile of lumber in a yard; the conveyers being so mounted on a portable platform that they are adapted to receive boards of a given length, say eighteen feet, when a wagon is being unloaded within an alleyway of a yard which may be about fourteen feet in width.

A further object is to provide in a device of the character indicated a conveyer or plurality of conveyers to be mounted on a portable platform for receiving boards as they are unloaded and elevating them as specified, said conveyer or conveyers being positioned to receive boards when placed at an angle to the pile of lumber being built up and at an angle to the direction in which the alleyway extends, said angle being perhaps of about 45 degrees.

A further object is to provide an elevating conveyer or a plurality of conveyers for carrying the boards from an elevation slightly above the ground to the top of a pile of lumber, being built up, with means for reversing the direction of travel of the conveyers when the boards are to be lowered from the pile toward the ground, and means for automatically discharging the boards from the conveyers when they reach a given position in their upward travel.

A further object is to provide in connection with a conveyer or conveyers mounted as specified, suitable means for supporting a platform upon which a workman may stand and receive the boards as they are automatically discharged from the conveyers at a point adjacent to the top of the pile of lumber A further object is to provide in connection with a device of the type specified means adapted to be thrown into position manually for changing the elevation of the platform on which the workman stands, said means being operated from a main driving shaft.

A still further object is to provide means whereby the workman standing upon the platform at a point adjacent to the top of the pile of lumber may control the operation of the conveyers, thereby allowing him sufficient time to place a board in proper position on said conveyers when lumber is being removed from the pile.

A still further object is to provide means for automatically discharging the boards from the upper portion of the conveyers at a point adjacent to the top of the pile; said means being removable in part when the conveyers are being operated for removing the boards from the pile and discharging them at the bottom by employing suitable discharge means.

With the foregoing and other objects in view, the invention consists in the novel construction, combination and arrangement of elements, hereinafter described and claimed.

In the accompanying drawings:—

Figure 1 is a perspective view.

Fig. 2 is a view of the device in front elevation.

Fig. 3 is a top plan view, this view and the preceding view showing the position of the device with reference to the piles or stacks of lumber.

Fig. 4 is a rear elevation.

Fig. 5 is a view partly in section showing one of the devices extending transversely of the conveyers for receiving the boards.

Fig. 6 shows details of construction described below and also illustrated in Figs. 5 and 7.

Fig. 7 is a fragmentary view in vertical longitudinal section showing the means located near the lower ends of the conveyers for receiving the boards.

Figs. 8 and 9 are further views partly in section and partly in elevation showing the devices near the respective ends of the conveyers for receiving the boards.

Fig. 10 is a section on the line 10—10 of Fig. 9.

Fig. 11 is a detail view of the drum controlling means.

Before proceeding to the description of the device in detail, an outline of construction will be given. I provide a main platform supported upon axles and wheels in order that the entire structure may be portable and may be moved to suitable position in an alleyway between the piles or stacks of lumber. On this platform are mounted a plurality of uprights at the rear corners, an additional upright at one side near one of the corners of the platform, an intermediate platform for supporting certain driving mechanism, and an upper structure for supporting shafts and gearing through which motion is conveyed to the traveling devices for elevating the boards.

A structure constituting the inclined plane along which the boards are guided from a position adjacent to a wagon or the like to an elevation sufficient to enable their ready removal for disposition upon the top of a pile or stack, is mounted at an angle with one side of the platform constituting the base and therefore at an angle with the direction in which the alley between the lumber piles extends. The transverse inclination of the plane mentioned forms an important feature of the invention, inasmuch as it permits of the use of the machine in an alleyway having a width considerably less than the length of the boards to be stacked.

The surface of the inclined plane is provided with channels along which chains or traveling devices pass during their upward or downward movement, and the opposite runs of these chains pass through channeled members mounted in the rear of the inclined plane and suitably spaced.

Suitable means for receiving the boards at the lower portion of the inclined plane as they are removed from the wagon are provided, and the boards are engaged by devices carried by the chains at intervals for the purpose of elevating said boards to the required height.

Near the upper portion of the structure a platform extending transversely of the inclined plane is adjustably mounted and is provided with a runway for the accommodation of the workman removing the boards from a carrier or carriage into which they are automatically discharged by suitable means upon reaching the proper elevation. This platform and carriage are mounted in or suspended from a framework which travels along the inclined plane and which is provided with supporting brackets having internally threaded portions engaged by screws extending from the lower portion of the plane to the upper portion thereof and driven from the main shaft, thus providing for the gradual elevation of the platform and its carrier so that these elements will be in proper position with reference to the top of the lumber pile as it is being gradually built up.

The main driving shaft mounted above the base or platform is driven by a suitable motor and means are provided whereby the screws may be driven in either direction and the traveling devices or chains correspondingly operated in order that the boards may be elevated or lowered from the pile as desired.

Referring now to the drawings in detail, the base or platform is designated 10 and is mounted on axles 12 and 14 carried upon wheels 15. A plurality of uprights 16 and 17 are mounted upon opposite corners of the rear portion of the base, and an additional upright 18 is mounted adjacent to one of said uprights first-named. A platform 19 is mounted at a point intermediate of the upper and lower portions of the structure and carries shaft 20 mounted in bearings 21, said shaft being driven from the main shaft 22 which in turn is operated from the motor shown conventionally at 23.

The upper portion of the framework includes a transverse member 25, and below the latter a platform or the like, 26, upon which the shaft and gearing for driving the chains are mounted. These elements are driven from shaft 20, the main upper shaft being designated 27. The front portion of the structure along which the boards travel includes a plurality of spaced bars or strips 28, 29, 30 and 31 provided with channels 32 along which the operative portions of the chains 33 travel. These chains are provided with engaging devices 34 which receive the boards to be elevated or lowered, as the case may be. The channel members for receiving the opposite runs of the chains are shown more particularly in Fig. 4 and are designated 38.

In Figs. 2 and 3 I have shown conventionally certain lumber piles or stacks with alleyways therebetween in one of which the machine is operating.

Referring to the driving mechanism in detail, the motor 23 is provided with a shaft 40 carrying a pulley 41 driving a belt 42 which imparts motion to a pulley 43 shown in Fig. 1 and carried on shaft 22. Shaft 22 constitutes a main driving shaft and carries a pulley 44 driving belt 45 and pulley 46 on shaft 20, said shaft last-named carrying a pulley 47 driving belt 48 which imparts movement to a pulley 49 mounted on upper transverse shaft 27. Shaft 27 carries a plurality of beveled gear wheels 50

51, 52 and 53 meshing with gear wheels 54, 55, 56 and 57 carried by short shafts 58 mounted in bearings formed in brackets 59 carried upon platform 26. Rigidly mounted with reference to gear wheels 54, 55, 56 and 57 are sprocket wheels, 60, 61, 62 and 63 each of which carries a chain 34 and drives the latter. The chains are carried at their lower ends on sprocket wheels 65 mounted in brackets 66 carried by the base or platform 10.

The chains 34 are driven continuously during the operation of elevating the boards, but during the operation of lowering the boards from the top of the stack it is desirable to discontinue the operation of the chains at intervals, in order that the workman on the upper platform may have time to place the boards in position to be lowered. Provision is therefore made for stopping the chains or conveyers by disconnecting pulley 44 from shaft 22 through the medium of a clutch, one member of which is shown at 68, such member being operated by a bell crank lever 69 under the control of a connecting device 70 extending to the upper portion of the structure and pivotally secured to a bell crank lever 71 pivoted at 72 and having connection with a cord or the like 73 extending downwardly to a compensating device mounted on the movable platform and within reach of the operator thereon. This compensating device provides for the increased or decreased distance between the upper end of lever 71 and the shaft and drum on which the flexible device 73 is wound.

The screws for controlling the position of the platform are designated 75 and 76 and are provided at their lower ends with beveled gear wheels 77 meshing respectively with beveled gear wheels 78 carried on a shaft 79 mounted transversely of the structure and positioned immediately behind the inclined plane. Shaft 79 carries a pulley 80, driven by belt 81, and pulley 82 mounted on shaft 22. A clutch 83 provides means for throwing pulley 82 into and out of engagement with the shaft 22 and therefore provides for controlling the rotation of screws 75 and 76 for elevating the platform and its carrier.

A lever 89 is pivoted at its lower end and coöperates with a segment 90 and controls clutch 83 and clutch 88, the latter control being effected by means of a link 91 having connection with the lever at a suitable point. Belt 86 is twisted as shown and imparts a reverse movement to shaft 79 for imparting a corresponding movement to screws 75 and 76 during the operation of lowering the platform and carriage after throwing in clutch 88.

The screws 75 and 76 coöperate with threaded members 96 carried upon plate members 97 forming a part of brackets 98 which extend outwardly from the surface of the inclined plane and carry horizontal supporting members 99 from which the platform is suspended. These brackets include braces 100 and said brackets extend through openings between the strips or bars 28, 29, 30 and 31 along which the chains travel. The pitch of the screws 75 and 76 is such that a comparatively slow movement is imparted to the structure supporting the platform. Threaded members 96 are each provided with slots 96′ T-shaped in cross section and adapted to operate as guides. These devices 96 are slidable with reference to T-shaped angle bars 97′ mounted parallelly with reference to the screws 75 and 76. A sectional view of this construction is shown in Fig. 10, the section being on line 10—10 of Fig. 9.

Extending transversely of the brackets 98 and connected therewith is a bar 101 carrying deflecting devices 102 which extend downwardly, and the lower ends of these devices are in contact with the surfaces 28′, 29′, 30′ and 31′ which are positioned in a plane substantially coincident with the inner or middle portions of the channels carrying the chains. This construction makes it possible to carry the boards in such position that when they reach the discharge elevation they will be slightly spaced from the lower edges of deflecting devices 102, at which time the boards will be thrown outwardly upon apron 104 detachably secured to one edge of receiving device and carrier 105. This device includes a plurality of side members 106 and 107 between which a series of rollers 108 is mounted for receiving the boards when discharged transversely across the apron 104.

The detachable connection for the apron 104 includes hinge members 109 secured by pins 110. The apron is detached when boards are being removed from the top of a stack and placed first on the carrier and thence transferred to the traveling members, to be engaged by the devices 34 thereon, prior to the operation of lowering the boards.

The platform includes a runway 111 supported upon lower transverse members 112 which members in turn have connection with uprights 113 and 114, and further have connection with upwardly extending arms 115 secured to transverse members 116, the opposite ends of which are connected with one of the members 113, 114 above mentioned. An outer transverse bar 120 constitutes a front railing for the platform. The underside of the carrier is provided with U-shaped members 116′ adapted to extend around members 116 above referred to and constitute guiding devices, thereby permitting the movement of the carrier or carriage toward and away from the surface of the inclined plane.

In removing boards from the top of a stack, the workman first places the boards on the carrier and then transfers them to the edge thereof adjacent to the traveling members or conveyers whence they are placed in engagement with devices 34 on these conveyers. The conveyers are then placed in operation for the purpose of lowering the board, this being effected by means of a device within reach of the workman and connected with the upper bell crank lever 71. A transverse shaft 120' carries a plurality of arms 121 from which cords or the like 122 depend so that they may be reached by the operator from any position on the platform, and said shaft 120' carries a compensating device for the purpose of taking up the slack in the cord 73 due to the movement of the platform to various positions with reference to the top of the inclined plane. This compensating device includes a drum 125 around which the cord 73 passes and one end of this drum is provided with clutch teeth 127 adapted to be engaged by a pin or other suitable device 128 mounted rigidly on the shaft. The drum is mounted loosely on said shaft, and a spring 130 serves to retain the engaging device and the clutch teeth in proper position to permit the coöperation of the elements. A spring 131 mounted on the opposite end of the shaft between a bracket 132 and the pin 133 serves to return the shaft to normal position when partly rotated by pulling on cord 122. A slight movement of the shaft longitudinally in order to produce positive engagement between the clutch teeth and the coöperating engaging device 128 is accomplished through the medium of a member 135 having a cam surface, said member 135 being mounted rigidly on the shaft and engaging the inclined surface 136 of the bracket 132.

The apron 104 is provided on the underside with brackets 140 which bear against one of the side bars of the carrier or carriage and assists in supporting said apron in an inclined position for the purpose of receiving the boards when they are thrown outwardly by the deflecting devices above described.

A horizontally mounted bar 145 is supported on brackets 146 each including a plurality of outwardly extending members designated 147 and 148, the portions 148 being provided with hinged members 149 at their outer ends for the purpose of engaging complementary hinged members 150 carried by a detachable bar 151 projecting outwardly from the outer edge of the horizontal bar above mentioned. Said hinged members are secured by means of pins 152, and the bars 145 and 151 are further secured by means of angular braces 153 secured to bar 151 and passing downwardly under the lower surface of bar 145.

This construction is shown in detail in Fig. 2, and in Fig. 7 I have shown a construction in which a lower carrier 165 is provided in lieu of the bar 151. It may be mentioned at this point that bar 151 carries an adjustable stop-member 159 at one end for the purpose of engaging the ends of the boards.

Bar 151 is employed when the conveying devices are being used for elevating the boards to the top of the pile, it only being necessary to place said boards in position on transverse bar 145 and within the space between the inclined plane and bar 151.

When the boards are being lowered, means for discharging the same from the traveling conveyers are provided, and this structure includes a carrier 165 provided with rollers 166 and with deflecting devices 167 extending from the inner edge of the carrier to a position adjacent to the surface of the inclined plane, spaces or slots 168 being provided for the passage of the chains and the engaging devices 34 thereon. When the boards come into proper position as they are lowered they are engaged by devices 167 and are deflected outwardly to the horizontal carrier just mentioned, being then in position for easy removal by the workman stationed at the lower end of the device who may desire to place the boards upon a wagon or otherwise dispose of them.

The device receiving the boards as they are discharged at the lower end is provided with a plurality of hinged members 170, 171, adapted to be detachably secured to outwardly extending members 147 carri the brackets 146. These elements may be secured by means of short threaded pins or the like 172 carrying nuts 173. Hinged members 170, 171 are secured by means of rods or pins 177, the purpose being to render carrier 165 and discharge member detachable from the bar 145.

The brackets 146 are each provided with apertured lugs 147' constituting guiding members, these lugs being engaged by upwardly extending rods 180 along which the brackets may be moved for the purpose of adjusting the position thereof and consequently the position of the bar 145 and the respective members carried thereby when boards are being elevated or lowered as the case may be. The position of bar 145 and the brackets carried thereby is controlled by means of a plurality of flexible devices 181 and 182 passing over pulleys 183 and extending downwardly and around a winding shaft 184 operated by means of a crank arm 185. Shaft 184 may be provided with a ratchet wheel 186 engaged by a dog 187 for the purpose of retaining the shaft in suitable position.

Drum 125 is held in position to hold cord 73 taut by means of a coiled spring 125' secured to the flanged portion of the drum and to shaft 120'.

I claim:—

1. In a lumber stacking machine, a framework including an inclined member, conveyers for moving a board along the inclined member, certain of said conveyers being positioned in advance of the others for elevating a board while positioned diagonally with reference to the framework, means for receiving a board discharged from the conveyers, driving means for said conveyers, and means operated from the driving means for changing the position of the means receiving the board.

2. In a lumber stacking machine, a framework including an inclined member, conveyers for moving a board along said member, certain of said conveyers being positioned in advance of the others for elevating a board while positioned diagonally with reference to the framework, means for receiving a board discharged from the conveyers, deflecting means for causing such discharge of the boards, driving means for said conveyers, and means operated from the driving means for changing the position of the means receiving the board.

3. In a lumber stacking machine, a framework, including a base portion, an inclined member mounted thereon, said member having an inclination in two directions with reference to the longitudinal axis of the base, conveyers for moving a board along the inclined member and means for driving the conveyers.

4. In a lumber stacking machine, a framework including a base portion, a member having a transverse inclination with reference to the longitudinal axis of the base and conveyers coöperating with said member for moving a board from one end thereof toward the other end.

5. In a lumber stacking machine, a framework including a base portion, a plurality of conveyers mounted above the base, an inclined member mounted on the base, said conveyers being positioned to move a board upwardly along the inclined member, the conveyers being adapted to carry a board in a horizontal position, and said inclined member having a width greater than the width of the base, the sides of the member and base being substantially coincident.

6. In a lumber stacking machine, a framework, including a base portion, a plurality of conveyers mounted above the base, a member inclined rearwardly and upwardly with reference to the front of the base and inclined transversely with reference to the transverse axis of the base.

7. In a lumber stacking machine, a framework, a plurality of conveyers mounted therein, the operative runs of the conveyers being in a plane inclined upwardly and transversely with reference to the framework, driving means for the conveyers, an inclined member along which the boards are moved by the conveyers, and means for automatically removing the boards from said conveyers upon reaching a given elevation during the upward movement of the conveyers.

8. In a lumber stacking machine, a framework, a plurality of conveyers mounted therein, the operative runs of the conveyers being in a plane inclined upwardly and transversely with reference to the framework, driving members for the conveyers, an inclined member with which the conveyers are adapted to coöperate in elevating the boards and means extending at an angle with the upward inclination of the inclined member for automatically removing the boards from the conveyers upon reaching a given position during the downward movement of the conveyers.

9. In a lumber stacking machine, a framework, a plurality of conveyers mounted therein, the operative runs of the conveyers being in a plane inclined upwardly and transversely with reference to the framework, driving means for the conveyers, an inclined member with which the conveyers coöperate, means for automatically removing the boards from the conveyers and extending in a direction at an angle to the upward inclination of the inclined member, and means for changing the position of the board removing means.

10. In a lumber stacking machine, a framework, a plurality of conveyers mounted therein, driving means for the conveyers, an inclined member coöperating with the conveyers, a platform movable upon the inclined member, a board receiving device thereon, a device for removing boards from the conveyers and discharging them upon the receiving device, said board removing device including a transverse bar extending across the operative runs of the conveyers, and plates projecting from the face of the transverse bar and deflected toward the inclined member and then downwardly, an apron inclined from the receiving device toward the lower portions of the plates, and means for controlling the position of the platform and the device mounted thereon.

11. In a lumber stacking machine, a framework, a plurality of upwardly inclined conveyers mounted therein, the corresponding runs of said conveyers operating in a plane at an angle to the angle of upward inclination, driving means for the conveyers, an inclined member coöperating with said conveyers, members movable along the inclined member, a platform, a board receiving device suspended from said movable members, threaded devices carried by the members last-named, a plurality of screws engaging the threaded devices, and means for operating the screws and conveyers.

12. In a lumber stacking machine, a framework, a plurality of conveyers mounted therein, driving means for the conveyers, an inclined member, said member and conveyers being disposed at corresponding angles, members movable along the inclined member, a platform, and a board receiving device suspended from said movable members, threaded devices carried by the members last-named, stationary guiding means for the threaded members, a plurality of screws engaging the threaded devices and extending parallelly with reference to the guiding means, and means for operating the screws and conveyers.

13. In a lumber stacking machine, a framework, an inclined member mounted therein, said member being inclined in two directions with reference to the base portion of the framework, a plurality of conveyers adapted to move a board along the inclined member, and means for driving said conveyers, the driving means including a main shaft, a countershaft adapted to be driven in either direction with reference to the main shaft, an upper shaft, means for driving the latter from the countershaft, gear wheels carried by the upper shaft, a plurality of sprocket wheels, a plurality of gear wheels mounted respectively for driving the individual sprocket wheels, said gear wheels last-named meshing with the gear wheels on the upper shaft, the sprocket wheels carrying said conveyers, and means for supporting the opposite ends of the conveyers.

14. In a lumber stacking machine, a framework, a member mounted on said framework, and inclined in two directions with reference thereto, a plurality of conveyers mounted to coöperate with said member, and to elevate the boards along the latter and to move boards downwardly with reference thereto, a main driving shaft, means connected therewith and connected with the conveyers for driving the latter, a plurality of screws mounted longitudinally with reference to the inclined member, a device movable longitudinally with reference to said member and across the face thereof, threaded means carried by said device and engaged by said screws, means for rotating said screws from the driving means, and means for discontinuing the rotary movement of the screws independent of the operation of the driving means.

15. In a lumber stacking machine, a framework, an inclined member mounted thereon, a plurality of conveying devices for coöperating with said inclined member for moving boards along the face thereof, a platform, and a board receiving device mounted thereon, said platform being movable longitudinally with reference to the inclined member, driving means for the conveying devices, means operated thereby for changing the position of the platform and the board receiving device, means mounted adjacent to the platform and carried by the framework thereof for controlling the means for varying the position of the platform and board receiving device, said means including a shaft and winding drum, connecting members therefor, and means under the control of a workman on the platform for operating said shaft and drum for starting and stopping the operation of the controlling means.

In testimony whereof I affix my signature.

JOHN BABCOCK.